(12) United States Patent
Shintani et al.

(10) Patent No.: US 6,454,942 B1
(45) Date of Patent: Sep. 24, 2002

(54) LIQUID SEPARATION MEMBRANE MODULE

(75) Inventors: Takuji Shintani; Hiroki Ito; Masahiko Hirose; Masaaki Ando, all of Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/484,338

(22) Filed: Jan. 18, 2000

(30) Foreign Application Priority Data

| Jun. 8, 1999 | (JP) | ............................................. 11-161021 |
| Jun. 15, 1999 | (JP) | ............................................. 11-168610 |

(51) Int. Cl.7 ............................................. B01D 63/00
(52) U.S. Cl. ............. 210/321.74; 210/490; 210/321.72; 210/507; 210/508; 210/492; 210/493.4
(58) Field of Search ............ 210/321.6, 321.72–321.78, 210/321.82–321.87, 490, 507, 508, 321.74, 492, 493.4; 428/373; 66/195

(56) References Cited

U.S. PATENT DOCUMENTS

| 4,996,098 A | * | 2/1991 | Perusich et al. |
| 5,652,057 A | * | 7/1997 | Delker |
| 5,665,235 A | * | 9/1997 | Gildersleeve et al. |
| 6,277,282 B1 | * | 8/2001 | Kihara et al. |

FOREIGN PATENT DOCUMENTS

| FR | 1502610 | * | 10/1967 |
| JP | 53-044603 | * | 4/1978 |
| JP | 60-19001 | | 1/1985 |
| JP | 02-160905 | * | 6/1990 |
| JP | 3-66008 | | 3/1991 |
| JP | 09-141067 | * | 6/1997 |

OTHER PUBLICATIONS

Patent Abstracts of Japan, Publication No. 60019001 A, Publication Date Jan. 31, 1985, 1 page.

* cited by examiner

*Primary Examiner*—Ana Fortuna
(74) *Attorney, Agent, or Firm*—Rosenthal & Osha L.L.P.

(57) ABSTRACT

A liquid separation membrane module includes a semipermeable membrane receiving a pressure of a feed liquid, and a channel material arranged so as to support the back side of the semipermeable membrane. The channel material is a tricot knitted fabric knitted by a tricot knitting machine with two reeds and has a ground stitch portion and a convex portion. The tricot knitted fabric includes a thermoplastic synthetic filament yarn with a core/sheath type conjugated fiber having a high melting point polymer as a core component and a low melting point polymer as a sheath component. Thermoplastic synthetic filament yarns for forming the ground stitch portion and the convex portion have a substantially same fineness, and the yarns in the tricot knitted fabric are bonded with one another by melt adhesion of the low melting point component to rigidity the entire knitted fabric.

16 Claims, 13 Drawing Sheets

1-0/1-2            2-3/1-0

(A)            (B)

LIQUID SEPARATION MEMBRANE MODULE

FIELD OF THE INVENTION

The present invention relates to a heat-resistant liquid separation membrane module having a semipermeable membrane receiving a pressure of a feed liquid and a channel material supporting the back side of the semipermeable membrane, where the heat-resistant liquid separation membrane module is enabled to treat a feed liquid at a hot or high temperature, and a method of producing the same.

BACKGROUND OF THE INVENTION

A liquid separation membrane module using a semipermeable membrane is typically represented by a spiral wound type, in which a semipermeable membrane is formed into a long envelope (bag form). Into the envelope, a channel material is inserted that becomes a flow channel supporting a pressure of a feed liquid applied from the side of the semipermeable membrane and a permeate is introduced. The envelope is fixed to a hollow shaft at its open end and wound around it spirally with high density. In any of such a liquid separation membrane module, a feed liquid with a high pressure of not lower than the reverse osmotic pressure of the membrane is passed through the outside of the envelope, and the liquid permeated through the membrane is taken up through the inside of the envelope. Because the envelope receives a high pressure from outside, the channel material that is inserted as a flow channel for permeate is crushed, and thus liquid flow is deteriorated. Thus, in general, the channel material is rigidified so that it can resist deformation and so that the channel material is not crushed even if a pressure is applied from outside of the envelope. Such a liquid separation membrane module is used in a wide variety of applications, such as pretreatment of boiler water, reuse of waste water, generation of fresh water from sea water, and RO packaged units for generating extrapure water, etc. Water having a temperature of not higher than 40° C. is used.

Traditionally, porous fabrics having fine channels extending therein, such as woven fabrics or knitted fabrics, have been used for this channel material, and particularly, a fabric having channels on its surface has been employed. Such a fabric has been rigidified by impregnating it with an epoxy or melamine resin, etc. so that it is not deformed easily by the pressure of a feed liquid applied via the membrane. To satisfy this, it was required that a resin is adhered to the fabric in an amount nearly half of its weight. However, in applications which requires a permeate with high purity or which processes a liquid of high temperature, problems have been caused by the elution of impregnated resins. Particularly, when the feed liquid to be treated with the membrane module is a fluid for food or medicine, it must be germ-free. Thus, the membrane module may be sterilized with a hot water to prevent contamination by germs of various sorts before or after carrying out membrane separation. Alternatively, in order to prevent contamination or control viscosity, or to prevent crystallization, a feed liquid itself may be treated with a high temperature greater than 40° C.

In order to solve the above-mentioned problems, a channel material produced by a tricot knitting machine with three reeds, in which the fiber for forming a convex portion of the knitted fabric is thicker than the fiber for forming a ground stitch, and a melt adhesive fiber is knitted to rigidify the entire knitted fabric, has been proposed (Japanese Published Examined Patent Application (Tokko) No. HEI 3-66008).

However, because such a channel material used three reeds and also used a yarn with a large fineness (denier) and a yarn with a small fineness (denier), it resulted in problems of low productivity and increased cost. Particularly, when a conjugated yarn having a low melting point component and a high melting point component was used, increased cost could not be ignored. Moreover, the thickness of the channel material could not be reduced.

Furthermore, in order to separate a solution with a liquid separation membrane module using a reverse osmosis membrane, it is necessary to apply a pressure of not lower than the osmotic pressure of the solution. At the same time, a differential pressure of usually about 0.5 to 1 MPa is loaded on the feed side and the permeate side. Then, if a single tricot knitted fabric 31 as shown in FIG. 10 or a double tricot knitted fabric 32 as shown in FIG. 11 is used for the above-mentioned permeate channel material, the reverse osmosis membrane is caved into the parallel channels aligning on one or both sides of the channel material and blocks them, resulting in a problem of increased flow resistance in the channels. When operation is continued for a long time under a high pressure while the reverse osmosis membrane is caved into the parallel channels of the permeate channel material, the reverse osmosis membrane 33 in contact with the concave and convex surface of the single tricot knitted fabric 31 is deformed as shown in FIG. 12, so that the cavities through which permeate is passed are crushed, and sufficient performance cannot be obtained. When a double tricot knitted fabric 32 is used, the reverse osmosis membranes 33 and 34 are deformed as shown in FIG. 13, so that the cavities through which permeate is passed are crushed, and sufficient performance cannot be obtained.

SUMMARY OF THE INVENTION

In order to solve the above-mentioned conventional problems, it is a first object of one or more embodiments of the present invention to maintain the structure and rigidity of a channel material for a long time without increasing flow resistance in channels and without impairing productivity of permeate, and to provide a liquid separation membrane module incorporating a channel material that does not cause elution and has a small thickness at a low cost.

It is a second object of one or more embodiments of the present invention to provide a practical liquid separation membrane module in which increase in flow resistance in channels of a permeate channel material caused by caving of a reverse osmosis membrane into the channels and deformation of the reverse osmosis membrane are inhibited, so that the performance of the reverse osmosis membrane can be maintained.

In order to achieve the above-mentioned first object, one or more embodiments of the present invention provide a heat-resistant liquid separation membrane module including a semipermeable membrane receiving a pressure of a feed liquid, and a channel material arranged so as to support the back side of the semipermeable membrane, wherein the channel material is a tricot knitted fabric knitted by a tricot knitting machine with two reeds and has a ground stitch portion and a convex portion. The tricot knitted fabric includes a thermoplastic synthetic filament yarn that has a core/sheath type conjugated fiber having a high melting point polymer as a core component and a low melting point polymer as a sheath component. Thermoplastic synthetic filament yarns for forming the ground stitch portion and the convex portion have substantially the same fineness. Yarns in the tricot knitted fabric are bonded with one another by melt adhesion of the low melting point component to rigidify the entire knitted fabric, thus forming the channel material.

In the liquid separation membrane module, it is preferable that the fineness of the thermoplastic synthetic filament yarns for forming the ground stitch portion and the convex portion is in the range of 45 to 55 denier.

Furthermore, in the liquid separation membrane module, it is preferable that the sinker loops of the knitted loops formed by one reed become the ground stitch portion, and the needle loops of the knitted loops and the chain portion formed by the other reed become the convex portion in the tricot knitted fabric.

Next, in order to achieve the second object of the present invention, it is preferable that, in one or more embodiments, the second liquid separation membrane module of the present invention further includes a flat fabric B laminated on the convex portion of the tricot knitted fabric A in the liquid separation membrane module, each of the fabrics is rigidified, and the cavity formed from the concave portion of the fabric A and the flat fabric B forms a flow channel that is not caved by the pressure required for reverse osmosis.

Furthermore, in the liquid separation membrane module, it is preferable that two or three layers are laminated.

Furthermore, in the liquid separation membrane module, it is preferable that the fabric B is a woven fabric or a nonwoven fabric.

Furthermore, in the liquid separation membrane module, it is preferable that the fabric B comprises a core/sheath type conjugated fiber having a low melting point polymer as a sheath component and a high melting point polymer as a core component, the fiber being melt adhered and fixed.

Furthermore, in the liquid separation membrane module, it is preferable that the fabrics A and B are integrated by melt adhesion, bonding or sewing.

Furthermore, it is preferable that the liquid separation membrane module can resist a reverse osmotic pressure of higher than 0 kg/cm$^2$ but not higher than 200 kg/cm$^2$.

Furthermore, it is preferable that the liquid separation membrane module is a spiral wound membrane element, in which a membrane is formed into a bag form, a permeate channel material being placed inside of the bag form, and the membrane is wound around a permeate collecting tube so that one end of the inside communicates with the permeate collecting tube.

Next, one or more embodiments of the present invention provide a method of producing a liquid separation membrane module including a semipermeable membrane receiving a pressure of a feed liquid, and a channel material arranged so as to support the back side of the semipermeable membrane. The method includes using a thermoplastic synthetic filament yarn comprising a core/sheath type conjugated fiber having a high melting point polymer as a core component and a low melting point polymer as a sheath component; knitting a fabric having a ground stitch portion and a convex portion by a tricot knitting machine with two reeds, while using thermoplastic synthetic filament yarns with a substantially same fineness for forming the ground stitch portion and the convex portion; heat treating the fabric at a temperature of not lower than the melting point of the low melting point polymer of the conjugated fiber but lower than the softening point of the high melting point polymer after it is knitted, so that yarns in the tricot knitted fabric are melt adhered with one another and fixed to rigidify the entire knitted fabric, thus forming the channel material; and placing the channel material on the back side of the semipermeable membrane.

In one or more embodiments of the method, it is preferable that the fineness of the thermoplastic synthetic filament yarns for forming the ground stitch portion and the convex portion is in the range of 45 to 55 denier.

Furthermore, in one or more embodiments of the method, it is preferable that the sinker loops of the knitted loops formed by one reed become the ground stitch portion, and the needle loops of the knitted loops and the chain portion formed by the other reed become the convex portion in the tricot knitted fabric.

DETAILED DESCRIPTION OF THE INVENTION

Figure 1:
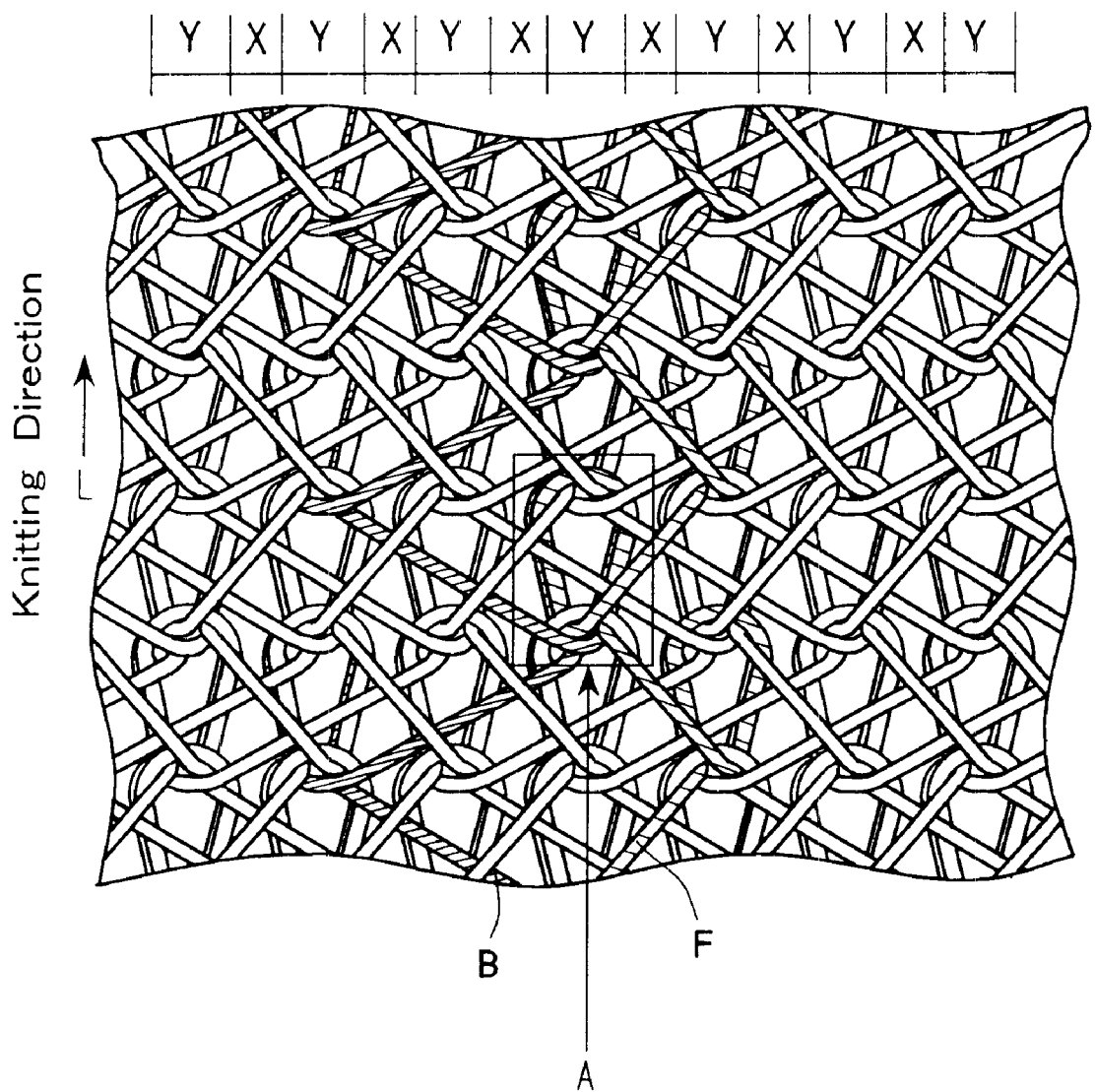
FIG. 1 is a plan illustration for knitting of a tricot knitted fabric with two reeds used in Examples 1 and 2 of the present invention.

A tricot knitted fabric as a material of the channel material of the present invention is knitted by a tricot knitting machine with two reeds. One example of the tricot knitted fabric is a fabric knitted with two reeds shown in FIG. 1, FIG. 2 (an enlarged illustration of the portion A of FIG. 1), and FIGS. 3 (A) and (B). The fabric knitted with two reeds shown in FIGS. 1 and 2 has a structure in which the yarn B knitted in the convex portion has the same thickness as the yarn F of the ground stitch portion. The yarn F is fed to the front reed and knitted in the stitch [1-0/1-2] as shown in FIG. 3 (A). The yarn B is fed to the back reed and knitted in the stitch [2-3/1-0] as shown in FIG. 3 (B). This knitting stitch is called a back half stitch. The sinker loops of the knitted loops formed by the front reed with this structure (dembigh stitch or 1/1 tricot stitch) become the ground stitch portion, and the needle loops of the knitted loops and the chain portion formed by the back reed form a cord stitch and become the convex portion. That is, the portion X of FIG. 1 becomes a ground stitch portion through which permeate flows, and the portion Y of FIG. 1 becomes a convex portion which keeps the cavity of the ground stitch portion X. The arrow L of FIG. 1 indicates the knitting direction.

As mentioned above, the tricot knitted fabric for the channel material of the present invention can be knitted using a thermoplastic synthetic filament yarns having the same fineness and using a tricot knitting machine with two reeds, and the ground stitch is formed by knitting a first yarn, and the convex portion is formed by knitting a second yarn into the needle loops formed by the first yarn. Thus, a tricot knitted fabric having a ground stitch portion and a convex portion is formed.

It is necessary that the tricot knitted fabric formed as mentioned above is further rigidified by adhering the yarns so that the fabric may not be crushed easily by a high pressure of a feed liquid.

The thermoplastic synthetic filament yarn having a low melting point component and a high melting point component may be in a form of a conjugated yarn. In the case of using a conjugated yarn, it is preferable to use a core/sheath type conjugated yarn having a low melting point sheath component and a high melting point core component because of its excellent adhesive quality.

It is preferable that the ratio of the low melting point component, which serves as an adhesive, does not exceed 50% to the amount of the two different components. However, this range is not limiting, as long as the high melting point component, which serves as a framework after melting, displays its function with an adequate strength. Moreover, the difference between the melting points of both components is at least 10° C., preferably 20° C. or higher.

Typical combinations of the high melting point polymer component and the low melting point polymer component include a high melting point polyester and a low melting point polyester, a high melting point polyamide and a low melting point polyamide, a high melting point polyolefin and a low melting point polyolefin, and the like. Among these, a combination of a high melting point polyester and a low melting point polyester is preferably employed in terms of its rigidity after melt adhesion, etc. Generally, a low melting point component can be obtained easily by copolymerization of polymers, and the difference between the melting points of the components can be varied, for example, by changing the ratio of copolymerization, having an additional copolymer component, changing a copolymer component, or changing stereoregularity or polymerization degree. Moreover, aside from these, combinations of different types of polymers having difference melting points may be employed. In the case of polyester, the melting point is decreased generally by 2° C. by copolymerizing in an amount of 1 mol %. In general, acid components such as isophthalic acid or adipic acid are used as the monomers to be copolymerized with polyester. When a polyethylene terephthalate (melting point of about 260° C.) is used as the high melting point component, a polybutylene terephthalate (melting point of about 225° C.) or a copolymer in which a polybutylene terephthalate is copolymerized with a predetermined amount of an arbitrary monomer is used as the low melting point component. For example, the melting point of a copolymer of a polybutylene terephthalate (75 mol %) and an isophthalate (25 mol %) is about 175° C.

It is necessary that a thermoplastic synthetic filament yarn comprising a combination of the above mentioned both components is used in the ground stitch portion and convex portion. Moreover, it is desired that the low melting point components used in both portions have the same melting point.

Figure 4:
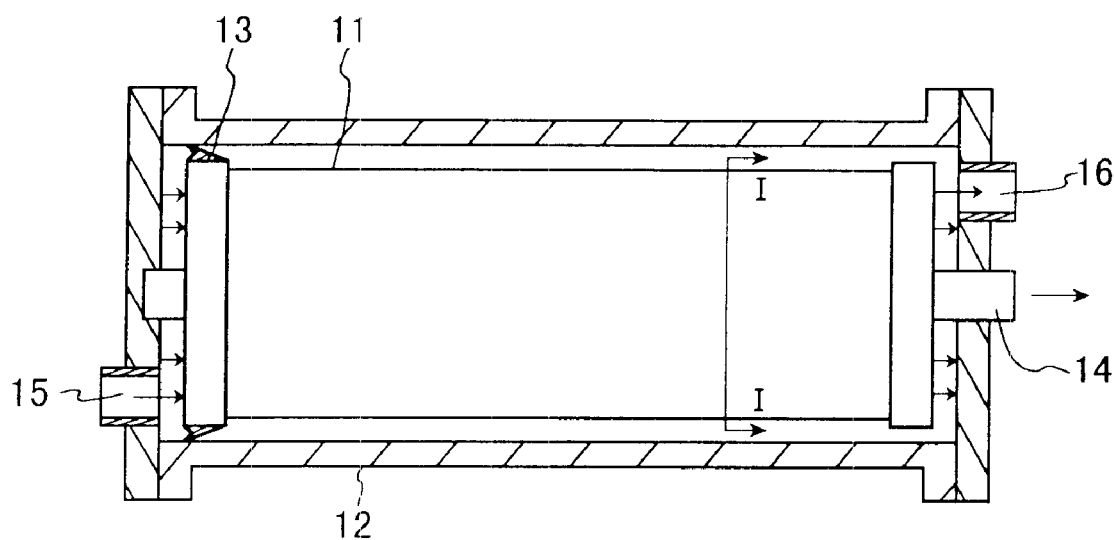
FIG. 4 is a sectional view of a spiral wound type liquid separation membrane module according to one example of the present invention.
Figure 5:
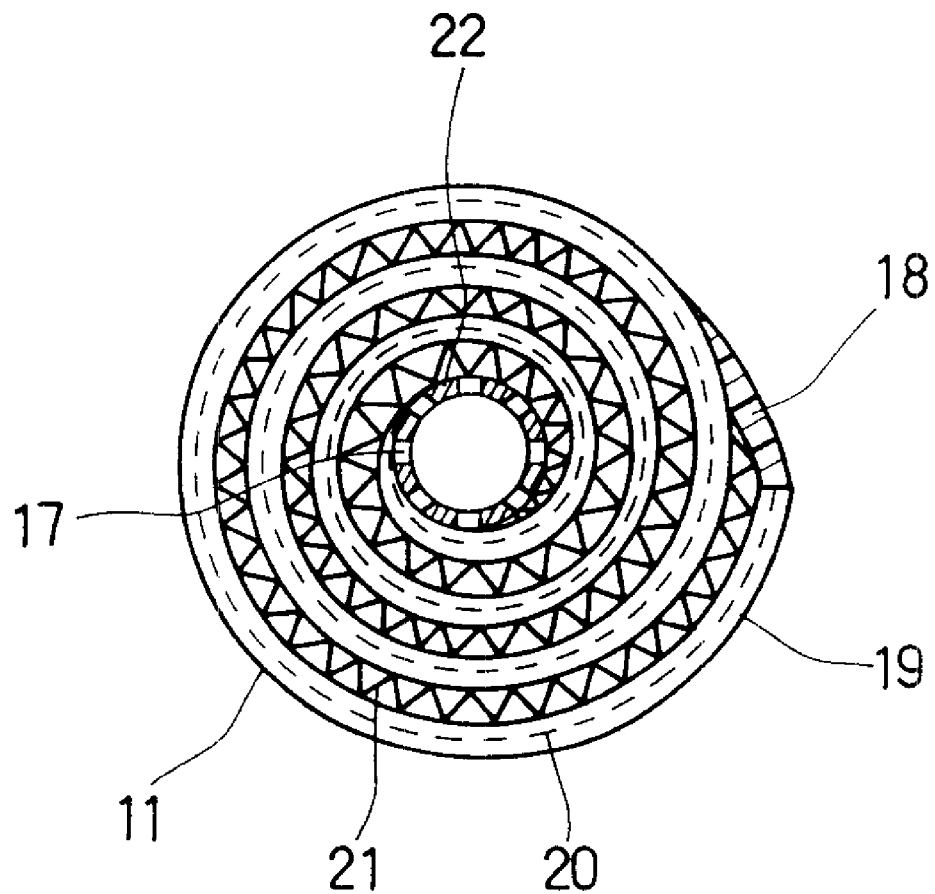
FIG. 5 is a cross section taken along the line I—I of FIG. 4.

FIGS. 4 and 5 illustrate a spiral wound type liquid separation membrane module using the above-mentioned channel material.

Numeral 11 indicates a liquid separation element, and numeral 12 indicates a cylindrical container that houses the liquid separation element 11. The liquid separation element 11 is sealed with a V-shaped sealing material 13 at its one end in the cylindrical container 12, and at the other end a permeate discharge pipe 14 is protruded to the outside of the cylindrical container 12. In the cylindrical container 12, a feed pipe 15 is positioned in the side wall where the V-shaped sealing material 13 is opened, and a feed discharge pipe 16 is provided in the other side wall of the container.

In the liquid separation element 11, a permeate discharge pipe 22 comprising a hollow pipe having small pores 17 is placed at the center as shown in FIG. 5, and an envelope-shaped semipermeable membrane 19 is wound spirally around the outside of the pipe. A permeate channel material 20 according to an embodiment of the present invention is inserted inside of the envelope-shaped semipermeable membrane 19, and its open end is turned to the pores 17 so as to communicate with the inside of the permeate discharge pipe 22. Furthermore, a feed channel material 21 is placed between the outer sides of the spirally wound envelope-shaped semipermeable membrane 19. Numeral 18 indicates a sealing portion.

Next, a membrane module in which a cave-in prevented channel is formed by using a fabric B is explained.

Any type may be employed as the fabric B as long as it is flat, and for example, a woven fabric, knitted fabric, nonwoven fabric, or the like may be employed. Among these, a woven fabric or a nonwoven fabric is preferably used. Examples of the woven fabric include plain weave, twill weave, and satin weave; and examples of the nonwoven fabrics include carding process nonwovens, air laying process nonwovens, wet process nonwovens (including synthetic fiber papers), spun bonded nonwovens, flash spun nonwovens, melt blown nonwovens, chemical bonding process nonwovens, thermal bonding process nonwovens, needle punched nonwovens, water jet process nonwovens, stitch bonded nonwovens, and the like.

Next, the fabrics A and B may be rigidified by melt adhering entirely by heating, or melt adhering each fabric separately by heating. Another measure for rigidifying these fabrics is to fix them with an adhesive. The adhesive used may be a hot melt type, solvent type, heat curing type, radiation curing type, room temperature curing type, or the like. Among these measures, it is preferable that a core/sheath type conjugated fiber having a low melting point polymer as a sheath component and a high melting point polymer as a core component, which is melt adhered and fixed by heating, is used as the fiber of the fabrics A and B. This is because, in order to produce an extrapure water or the like, it is necessary to prevent peeling of an adhesive or distilling of monomers as much as possible.

Typical combinations of the high melting point polymer and the low melting point polymer include a high melting point polyester and a low melting point polyester, a high melting point polyamide and a low melting point polyamide, a high melting point polyolefin and a low melting point polyolefin, and the like. Among these, it is preferable to use a combination of a high melting point polyester and a low melting point polyester in terms of its rigidity after being melt adhered, etc. Generally, a low melting point component can be obtained easily through copolymerization, and the difference between the melting points of the components can be varied, for example, by changing the ratio of copolymerization, having an additional copolymer component, changing a copolymer component, or changing stereoregularity or polymerization degree. Moreover, aside from these, combinations of different types of polymers having different melting points may be employed. In the case of polyester, the melting point is decreased generally by 2° C. by copolymerizing in an amount of 1 mol %. Generally, acid components such as isophthalic acid or adipic acid are used as the monomers to be copolymerized with polyester. When a polyethylene terephthalate (melting point of about 260° C.) is used as the high melting point component, a polybutylene terephthalate (melting point of about 225° C.) or a copolymer in which a polybutylene terephthalate is copolymerized with a predetermined amount of an arbitrary monomer is used as the low melting point component. For example, the melting point of a copolymer of a polybutylene terephthalate (75 mol %) and an isophthalate (25 mol %) is about 175° C.

It is preferable that a thermoplastic synthetic fiber including a combination of the above-mentioned components is used at least in part of each of the fabrics A and B, and it is desired that the low melting point components used in these fabrics have the same melting point, so that the fabrics can be integrated by melt adhesion with a single heat treatment. As a measure other than melt adhesion, sewing may be employed.

The channel material used in the present invention can resist a reverse osmotic pressure in the range of 0 to 200 kg/cm$^2$, and is enabled that the flow channels are not caved even after a long time operation under a pressure within the above-mentioned range.

The liquid separation membrane module of one or more embodiments of the present invention can be used suitably in a spiral wound membrane element, in which a membrane is formed into a bag form, a permeate channel material being placed inside of the bag form, and the membrane is wound around a permeate collecting tube so that one end of the inside communicates with the permeate collecting tube. It is preferable that the permeate channel material has parallel channels aligning inside.

In one or more embodiments of the present invention, it is necessary that the parallel channels are located inside of the permeate channel material. The inside of the permeate channel material herein refers to the inner portion of the channel material that does not contact with the back side of the reverse osmosis membrane directly. If the parallel channels are located in a portion in contact with the reverse osmosis membrane, when a pressure is applied for separation with the reverse osmosis membrane, the reverse osmosis membrane may be caved into the channels and blocks them, resulting in increased flow resistance in the permeate channels. Moreover, when operated for a long time under a high pressure, the reverse osmosis membrane may be deformed and damaged, resulting in reduced performance.

The permeate channel material for a reverse osmosis membrane in accordance with an embodiment of the present invention can accomplish a practical liquid separation membrane module, in which increase in flow resistance in channels caused by caving of a reverse osmosis membrane into the channels and deformation of the reverse osmosis membrane are inhibited, so that the performance of the reverse osmosis membrane can be maintained.

Furthermore, in order to achieve a permeate channel material having parallel channels aligning inside, it is preferable that a sheet with a firm and dense structure is fused with a permeate channel material, which is a traditional single or double tricot knitted fabric, at its surface having the channels, forming a laminate of two or three layers.

Figure 6:
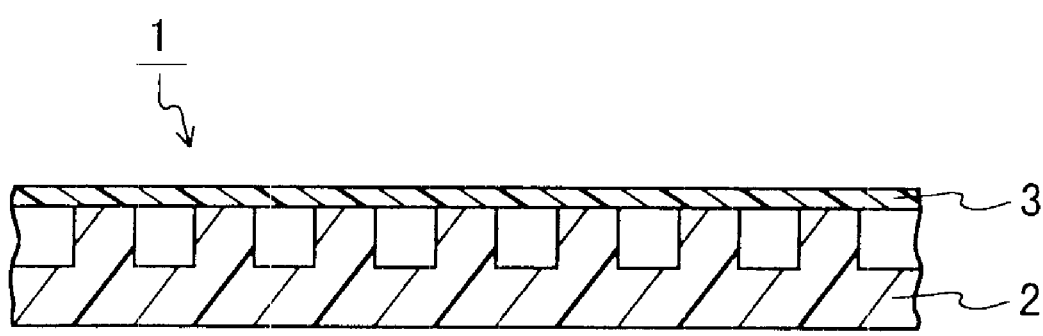
FIG. 6 is a sectional schematic illustration of a channel material of Example 3 according to the present invention.
Figure 7:
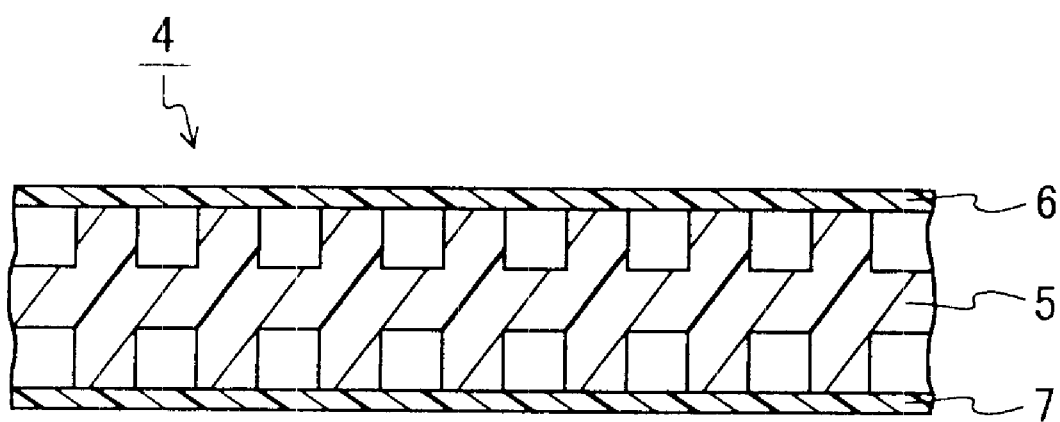
FIG. 7 is a sectional schematic illustration of a channel material of Example 4 according to the present invention.

As the above-mentioned two-layered laminate structure, for example, a flat fabric 3 (e.g. plain weave) may be fused integrally with the concave and convex surface of a single tricot knitted fabric 2, forming a channel material 1 shown in FIG. 6. In another example, flat fabrics 6 and 7 (e.g. plain weave) are fused integrally with the concave and convex surfaces as both surfaces of the double tricot knitted fabric 5, forming a channel material 4 shown in FIG. 7.

Figure 8:
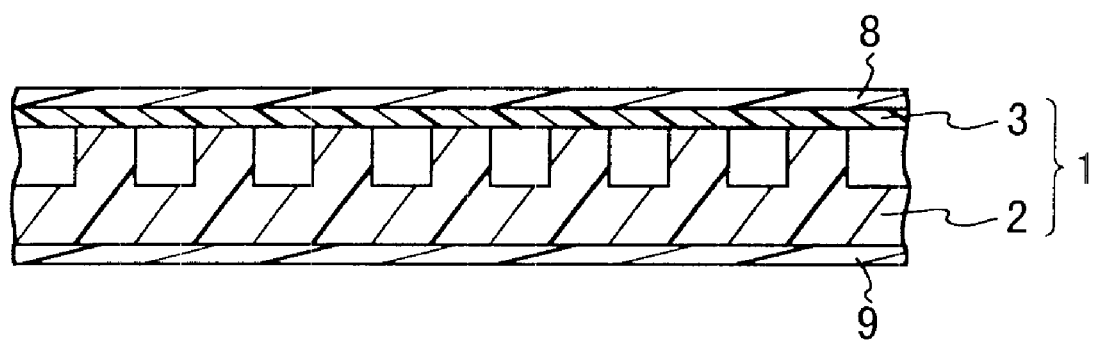
FIG. 8 is a sectional schematic illustration in which a reverse osmosis membrane is placed on the channel material of Example 3 according to the present invention.
Figure 9:
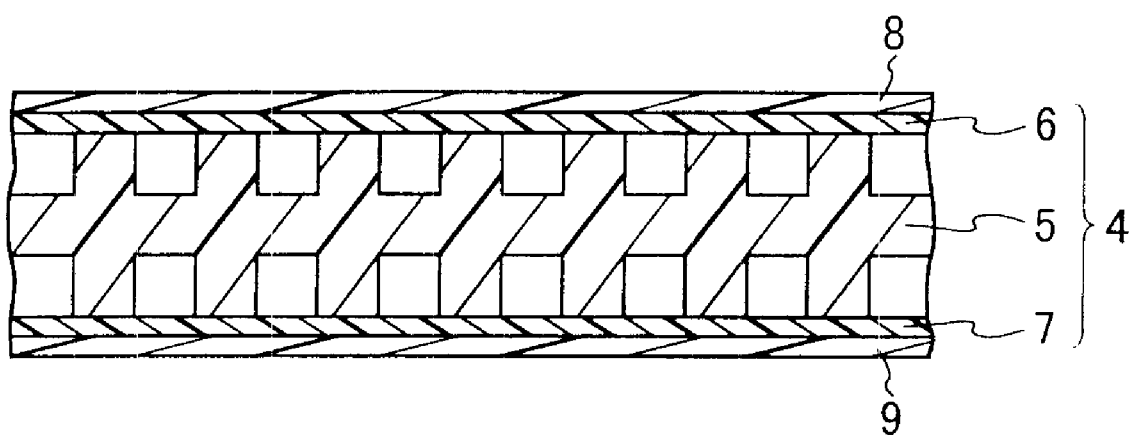
FIG. 9 is a sectional schematic illustration in which reverse osmosis membranes are placed on the channel material of Example 4 according to the present invention.
Figure 10:
FIG. 10 is a sectional schematic illustration of a single tricot knitted fabric used for a conventional channel material.
Figure 11:
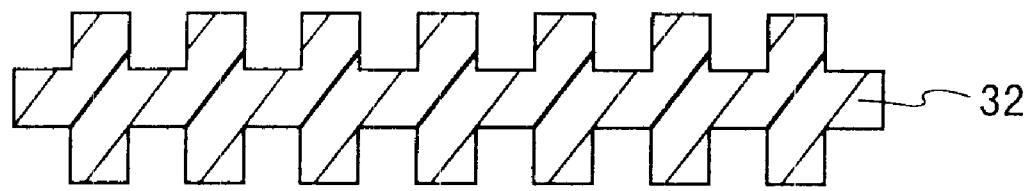
FIG. 11 is a sectional schematic illustration of a double tricot knitted fabric used for a conventional channel material.
Figure 12:
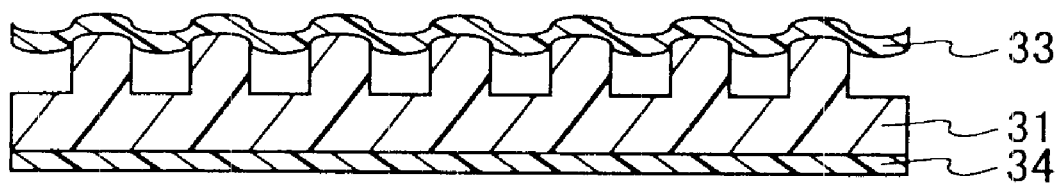
FIG. 12 is a sectional schematic illustration in which reverse osmosis membranes are placed on a single tricot knitted fabric used for a conventional channel material and has been operated for a long time.
Figure 13:
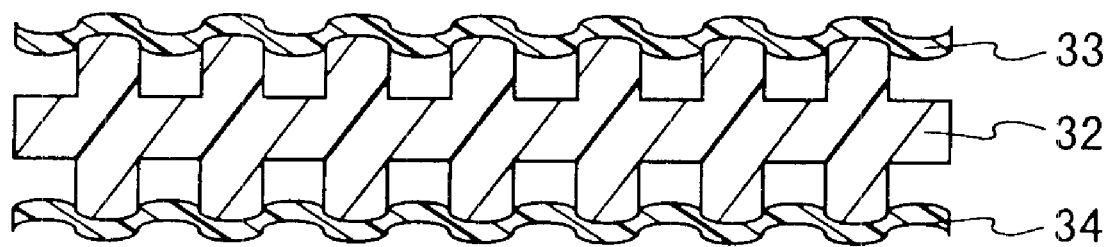
FIG. 13 is a sectional schematic illustration in which reverse osmosis membranes are placed on a double tricot knitted fabric used for a conventional channel material and has been operated for a long time.

Reverse osmosis membranes are placed on the channel materials 1 and 4 so that the dense sides 8 and 9 of the membranes may face the surfaces of the channel materials (FIGS. 8 and 9).

The spiral wound type liquid separation membrane module using the above-mentioned channel material is incorporated in an apparatus as shown in FIGS. 4 and 5.

Embodiments of the present invention is described further in detail by referring to the following examples.

EXAMPLE 1

A filament yarn comprising 12 filaments having a high melting point polyester (polyethylene terephthalate: melting point of about 260° C.) as a core component (70 wt. %) and a low melting point polyester (a copolymer of polybutylene terephthalate (75 mol %) and isophthalate (25 mol %) (melting point of about 175° C.)) as a sheath component (30 wt. %) and having a total fineness of 50 denier was prepared.

Figure 2:
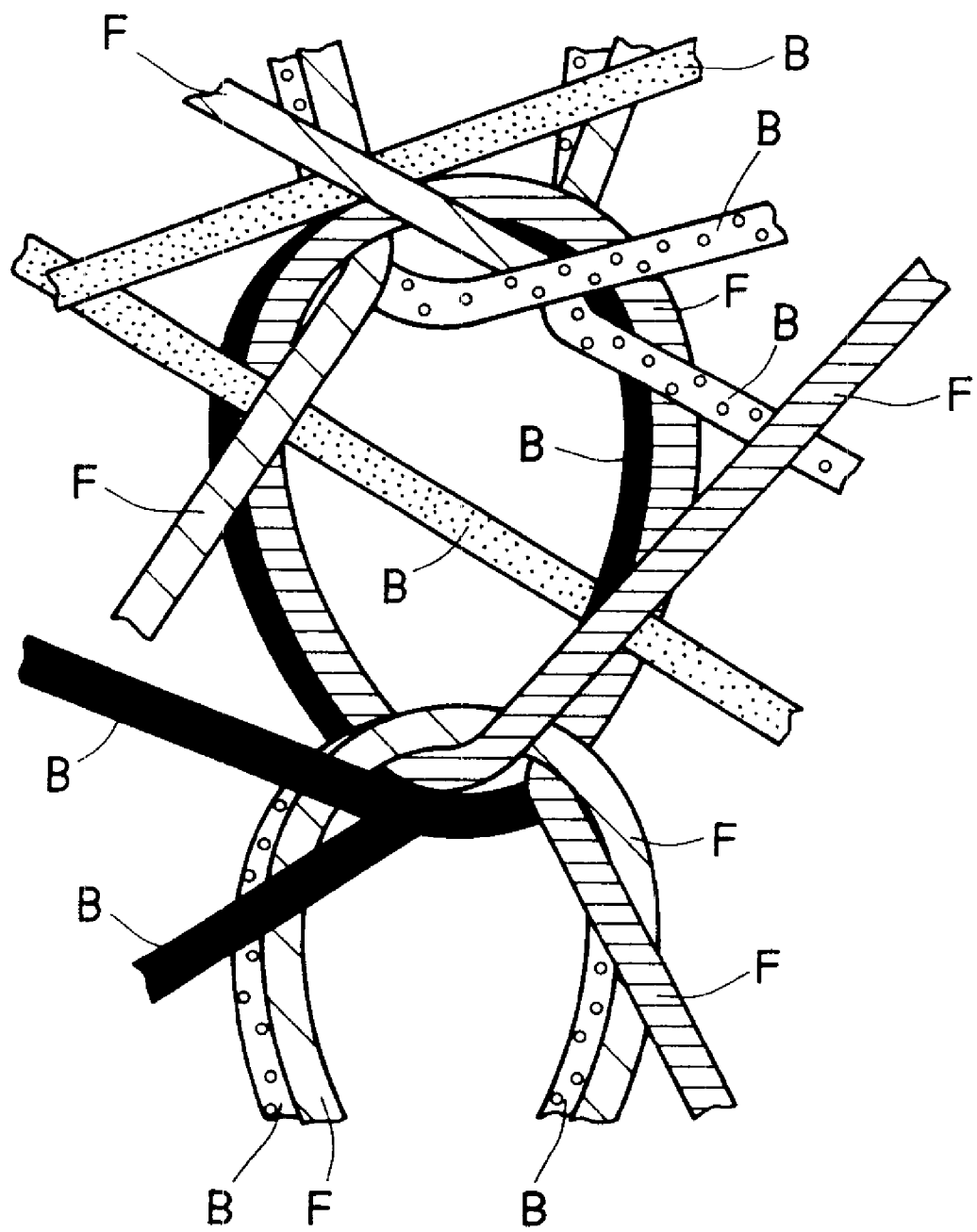
FIG. 2 is a partially enlarged illustration for knitting of the A portion of FIG. 1.
Figure 3:
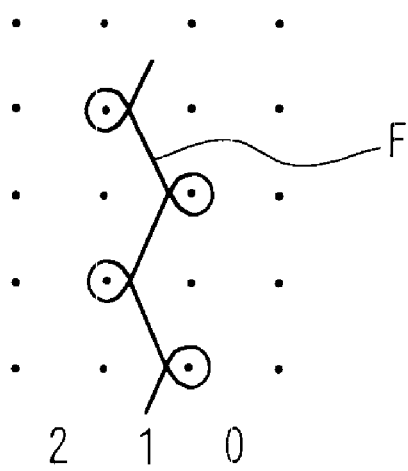
FIGS. 3(A), 3(B) are a stitch representation of a tricot fabric knitted with two reeds used in Examples 1 and 2 of the present invention.
Figure 3:
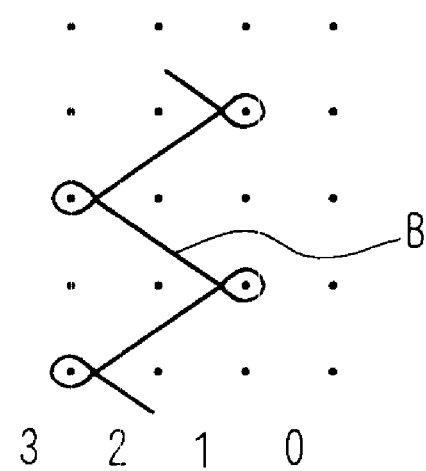

Using this filament yarn, a tricot knitted fabric having 28 gauge was formed by two reeds with a stitch as shown in FIGS. 1 to 3 (back half stitch). Then, the tricot knitted fabric was refined, and after being dried, it was melt adhered by heating at 180° C. for one minute under a tenter condition so that the wale density and the course density become 38 wales/inch and 45 courses/inch, respectively, after the heating. Thus, a channel material P according to the present invention was produced.

On the other hand, aromatic polyamide based composite membrane (a membrane prepared by interfacial polycondensation of trimesic acid chloride and m-phenylenediamine produced by Nitto Denko Corporation) was prepared, and as shown in FIGS. 4 and 5, the channel material P was placed on the surface of the membrane, so that a heat-resistant spiral wound membrane module (membrane area of 6.5 m$^2$) was produced. This was incorporated in a cylindrical container 12.

The heat-resistant spiral wound membrane module was subjected to a reverse osmosis test using a NaCl aqueous solution of 1500 ppm (adjusted to PH 6.5) as a feed under conditions of a pressure of 15 kgf/cm$^2$ and a temperature of 23° C.

Next, the membrane module was operated for sterilization using a hot water at 90° C. without applying a pressure for one hour. After this operation, it was subjected to the above-mentioned reverse osmosis test. As a result, the permeate flow (m³/day) before the heating sterilization was 7.1, and the permeate flow after the heating sterilization was 6.9.

Comparative Example 1

In place of the thermoplastic synthetic filament yarn used in Example 1, a regular polyester filament (polyethylene terephthalate) yarn having the same fineness was used, and a tricot knitted fabric was formed. The fabric was refined in the same way as in Example 1. Then, a spiral wound membrane module was produced according to the same procedure as in Example 1 except for using a channel material Q that has been rigidified by impregnating it with an epoxy resin (impregnated amount of 18 wt. %) and the membrane module was operated for sterilization using a hot water at 90° C. without applying a pressure for one hour. The above-mentioned reverse osmosis test was carried out according to the same procedure as in Example 1 to evaluate the performance of the membrane module.

In the case of Comparative Example 1, the permeate flow rate (m³/day) was decreased considerably from 7.1 to 4.3 before and after the operation for sterilization at 90° C. for one hour. However, when the heat-resistant spiral wound membrane module of Example 1 according to the present invention was used, decrease in the permeate flow (m³/day) was very small, which was from 7.1 to 6.9 before and after the operation for sterilization at 90° C. for one hour. That is, by using the membrane module of the present invention, the permeate flow after treating with hot water can reach 1.5 times or greater as that in the case of using a conventional membrane module. Furthermore, in the case of Comparative Example 1, it was confirmed that an organic component was mixed in the permeate immediately after the operation for sterilization at 90° C. for one hour by a spectrophotometer for ultraviolet and visible region. However, in the case of Example 1, as a result of the same analysis, it was confirmed that the organic component was not mixed in the permeate.

EXAMPLE 2

Using the heat-resistant spiral wound membrane module produced in Example 1, a reverse osmosis test was carried out using a NaCl aqueous solution of 1500 ppm (adjusted to PH 6.5) as a feed under conditions of a pressure of 15 kgf/cm² and a temperature of 60° C. continuously for 200 hours. As a result, the decrease in the permeate flow (m³/day) before and after the operation for 200 hours was very small, which was from 7.1 to 6.8.

Comparative Example 2

The same test as in Example 2 was carried out except that the spiral wound membrane module of Comparative Example 1 was used.

In the case of Comparative Example 2, the permeate flow rate (m³/day) was decreased from 7.1 to 3.3 continuously before and after the operation for 200 hours. On the other hand, when using the heat-resistant spiral wound membrane module of Example 2 according to the present invention, decrease in the permeate flow (m³/day) was very small, which was from 7.1 to 6.8 before and after the operation for 200 hours. Moreover, because of the continuous operation, the degree of decrease in the permeate flow in Comparative Example 2 was greater than that in Comparative Example 1. This is because the epoxy resin used for rigidifying the channel material Q was eluted during the continuous operation at 60° C. for 200 hours, so that the channel material Q was crushed by the operation pressure, and the flow resistance in the permeate side was increased, thus leading to decreased permeate flow. In the case of Example 2, because the channel material was not impregnated with an epoxy resin, its rigidity was maintained, and decrease in the permeate flow could be prevented. By the above-mentioned examples and comparative examples, superiority of the present invention was confirmed. Moreover, an embodiment of the present invention is compared with a case in which a yarn with a large thickness was knitted into a convex portion using three reeds as disclosed in Japanese Published Examined Patent Application (Tokko) No. HEI 3-66008 as follows:

(1) Because the productivity of the knitting with two reeds according to the present invention is about 1.5 times greater than that of the conventional knitting using three reeds, the cost of production can be reduced.

(2) Although the conventional knitting using three reeds is complicated in terms of stock management and yarn control because of the use of three types of yarns, complexity is decreased in the knitting using two reeds according to the present invention.

(3) While a warp knitting machine with three reeds is special, a warp knitting machine with two reeds is common, so that it is more advantageous in terms of equipment.

(4) By employing the knitting with two reeds according to the present invention, it is possible to ensure the channels and at the same time reduce the thickness of the channel material, so that a compact channel material can be produced.

EXAMPLE 3

A plain woven fabric using a filament yarn comprising 12 filaments having the above-mentioned low melting point polyester as a sheath component and the above-mentioned high melting point polyester as a core component and having a total fineness of 50 denier (warp density of 102/inch, weft density of 74/inch, basis weight of 35 g/m²) was laminated on the surface having parallel channels (the convex and concave surface) of the tricot knitted fabric of Example 1. Then, by heating at 185° C. for 5 minutes, the entire laminate was rigidified and also the two layers were melt adhered, thus forming a channel material.

On the other hand, an aromatic polyamide based composite membrane (a membrane prepared by interfacial polycondensation of trimesic acid chloride and m-phenylenediamine produced by Nitto Denko Corporation) was prepared, and the above-mentioned channel material was placed on the surface of the membrane, and a heat-resistant spiral wound membrane module (membrane area of 6.5 m²) as shown in FIGS. 5 and 6 was produced.

The heat-resistant spiral wound membrane module was subjected to a permeation test for reverse osmosis membrane using a 5.8% salt solution with an increased pressure to 9 MPa, with an outlet flow of 5 L/min, at a temperature of 25° C. and pH 7. As a result, the performances of the reverse osmosis membrane after operating for 60 minutes were a rejection of 99.75% and a permeate flux of 0.72 m³/m²/day. After the test, no trace was found on the surface of the reverse osmosis membrane for caving into the channels of the permeate channel material, and also no damage to the membrane was observed.

Comparative Example 3

A permeate channel material (yarn diameter of 70 denier, 38 wales/inch, 45 courses/inch) was prepared by heating the single tricot knitted fabric using a polyester multifilament having a low melting point polyester as a sheath component and a high melting point polyester as a core component as used in Example 3 for rigidifying it. No plain woven fabric was laminated on this channel material. When the permeation test for reverse osmosis membrane as in Example 3 was carried out using one of this channel material, the performances of the reverse osmosis membrane after operating it for 60 minutes were a rejection of 99.52% and a permeate flux of 0.51 m$^3$/m$^2$/day. After the test, a trace was found on the surface of the reverse osmosis membrane for caving into the channels of the permeate channel material, and also resulting damage to the membrane was observed.

The same reverse osmosis membrane was used in Example 3 and Comparative Example 3 except only that the permeate channel materials were different. The low rejection after the test in Comparative Example 3 was a result of the damage caused when the reverse osmosis membrane was caved into the channels of the permeate channel material, and the low permeate flux was due to the increased flow resistance in the channels caused by caving of the reverse osmosis membrane into the channels to block them.

EXAMPLE 4

A double tricot knitted fabric was formed by modifying the tricot knitted fabric used in Example 1. This was impregnated with an epoxy resin, so that a permeate channel material (yarn diameter of 50 denier, 38 wales/inch, 45 courses/inch) was produced. Onto both surfaces of this channel material, a plain woven fabric comprising a regular polyester yarn comprising 12 filaments and having a total fineness of 50 denier (warp density of 102/inch, weft density of 74/inch, basis weight of 35 g/m$^2$) was adhered with an epoxy resin, which is a thermoplastic resin, and thus bonded three layers formed a permeate channel material. A reverse osmosis membrane was placed on this channel material. When the same permeation test for reverse osmosis membrane as in Example 3 was carried out, the performances of the reverse osmosis membrane after operating it for 60 minutes were a rejection of 99.73% and a permeate flux of 0.74 m$^3$/m$^2$/day. After the test, no trace was found on the surface of the reverse osmosis membrane for caving into the channels of the permeate channel material, and also no damage to the membrane was observed.

Comparative Example 4

A double tricot knitted fabric was formed using a regular polyester multifilament yarn comprising 12 filaments and having a total fineness of 50 denier. This was impregnated with an epoxy resin, so that a permeate channel material (yarn diameter of 50 denier, 38 wales/inch, 45 courses/inch) was produced. No plain woven fabric was laminated on this channel material. When the permeation test for reverse osmosis membrane as in Example 3 was carried out using this single channel material, the performances of the reverse osmosis membrane after operating it for 60 minutes were a rejection of 99.47% and a permeate flux of 0.48 m$^3$/m$^2$/day. After the test, a trace was found on the surface of the reverse osmosis membrane for caving into the channels of the permeate channel material, and also resulting damage to the membrane was observed.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A liquid separation membrane module comprising a semipermeable membrane receiving a pressure of a feed liquid, and a channel material arranged so as to support a back side of the semipermeable membrane, wherein:
   the channel material is a tricot knitted fabric knitted by a tricot knitting machine with two reeds and has a ground stitch portion and a convex portion;
   the tricot knitted fabric comprises a thermoplastic synthetic filament yarn that comprises a core/sheath type conjugated fiber having a high melting point polymer as a core component and a low melting point polymer belonging to a similar class of polymers as the high melting point polymer as a sheath component;
   thermoplastic synthetic filament yarns for forming the ground stitch portion and the convex portion having a substantially same fineness; and
   yarns in the tricot knitted fabric are bonded with one another by melt adhesion of the low melting point component to rigidity the entire knitted fabric.

2. The liquid separation membrane module according to claim 1, wherein the fineness of the thermoplastic synthetic filament yarns for forming the ground stitch portion and the convex portion is in a range of 45 to 55 denier.

3. The liquid separation membrane module according to claim 1, wherein sinker loops of knitted loops formed by one reed become the ground stitch portion, and needle loops of the knitted loops and a chain portion formed by the other reed become the convex portion in the tricot knitted fabric.

4. The liquid separation membrane module according to claim 1, wherein a difference between the melting points of the high melting point polymer and the low melting point polymer is at least 10° C.

5. The liquid separation membrane module according to claim 4, wherein a difference between the melting points of the high melting point polymer and the low melting point polymer is at least 20° C.

6. The liquid separation membrane module according to claim 1, wherein a ratio of the low melting point polymer to the high melting point polymer and the low melting point polymer is not more than 50 wt. %.

7. The liquid separation membrane module according to claim 1, wherein a combination of the high melting point polymer and the low melting point polymer is at least one selected from a high melting point polyester and a low melting point polyester, a high melting point polyamide and a low melting point polyamide, and a high melting point polyolefin and a low melting point polyolefin.

8. The liquid separation membrane module according to claim 7, wherein a combination of the high melting point polymer and the low melting point polymer is a high melting point polyester and a low melting point polyester.

9. The liquid separation membrane module according to claim 1, which is a spiral wound membrane element, wherein a membrane is formed into a bag form, a permeate channel material being placed inside of the bag form, and the membrane is wound around a permeate collecting tube so that one end of the inside communicates with the permeate collecting tube.

10. The liquid separation membrane module according to claim 1, further comprising a flat fabric laminated on the convex portion of the tricot knitted fabric, each of the fabrics being rigidified, wherein
- a cavity formed from the concave portion of the tricot knitted fabric and the flat fabric forms a flow channel that is not caved by the pressure required for reverse osmosis.

11. The liquid separation membrane module according to claim 10, wherein two or three layers are laminated.

12. The liquid separation membrane module according to claim 10, wherein the flat fabric is a woven fabric or a nonwoven fabric.

13. The liquid separation membrane module according to claim 10, wherein the flat fabric comprises a core/sheath type conjugated fiber having a low melting point polymer as a sheath component and a high melting point polymer as a core component, the fiber being melt adhered and fixed.

14. The liquid separation membrane module according to claim 10, wherein the tricot knitted fabric and the flat fabric are integrated by a method selected from a group consisting of melt adhesion, bonding and sewing.

15. The liquid separation membrane module according to claim 10, which can resist a reverse osmotic pressure of higher than 0 $kg/cm^2$ but not higher than 200 $kg/cm^2$.

16. The liquid separation membrane module according to claim 10, which is a spiral wound membrane element, wherein a membrane is formed into a bag form, a permeate channel material being placed inside of the bag form, and the membrane is wound around a permeate collecting tube so that one end of the inside communicates with the permeate collecting tube.

* * * * *